(No Model.)
W. W. ROSENFIELD.
PNEUMATIC LUBRICATOR.
No. 285,162. Patented Sept. 18, 1883.
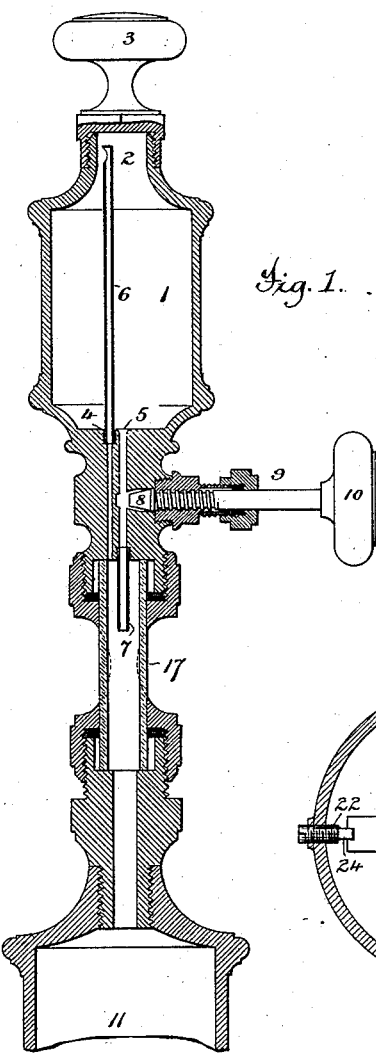
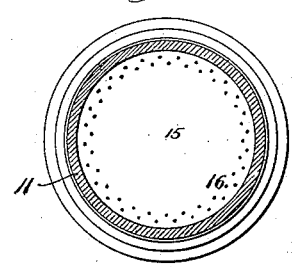
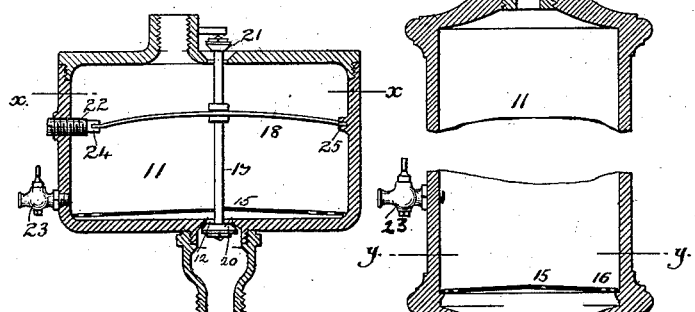
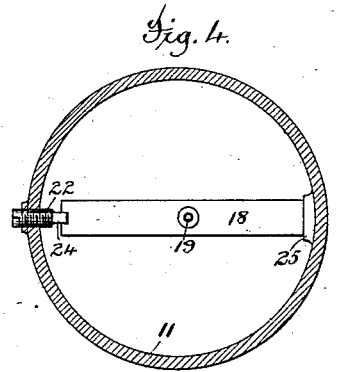
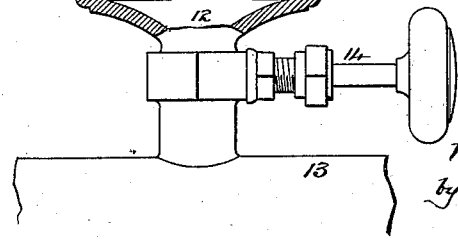
Attest:
Geo. H. Graham
A. N. Jasbera
Inventor,
Wm. W. Rosenfield,
by Munson & Philipp
Attys.

UNITED STATES PATENT OFFICE.

WILLIAM W. ROSENFIELD, OF NEW YORK, N. Y.

PNEUMATIC LUBRICATOR.

SPECIFICATION forming part of Letters Patent No. 285,162, dated September 18, 1883.

Application filed February 7, 1883. (No model.)

*To all whom it may concern:*

Be it known that I, WM. W. ROSENFIELD, a citizen of the United States, residing in the city of New York, county of New York, and State of New York, have invented certain new and useful Improvements in Pneumatic Lubricators, fully described and represented in the following specification and the accompanying drawings, forming a part of the same.

In United States Letters Patent No. 266,530, granted to me October 24, 1882, I have shown and described an apparatus designed for feeding oil against the pressure of the steam to the pistons, valves, &c., of engines, and for other purposes.

The present invention relates to an apparatus of the character therein shown and described; and it consists in certain details of construction by which the operation of the apparatus is rendered more certain and reliable, and by which any irregularity or stoppage can at once be detected. The invention also embraces certain features by which the size of the air-chamber may be greatly reduced.

In the accompanying drawings, Figure 1 is a transverse vertical section of a feeding apparatus such as shown in the patent referred to when modified so as to embody certain features of the present invention. Fig. 2 is a transverse section taken upon the line $y\, y$ of Fig. 1. Fig. 3 is a vertical section, showing devices for automatically supplying air to the air-chamber, so that its size may be greatly reduced. Fig. 4 is a transverse section taken upon the line $x\, x$ of Fig. 3.

The general structure of the apparatus in which the present invention is embodied being the same as that shown in my former patent, a very brief description will suffice.

The apparatus consists of an oil cup or receptacle, 1, of suitable size to contain the desired quantity of oil, and made air-tight in all its parts and connections, it being provided at its top with an opening, 2, closed by a screw cap or plug, 3, which can be readily removed for the filling of the cup. The bottom of the oil-cup is provided with two small openings, 4 5, into one of which is fitted a tube, 6, which extends upward to a point near the top of the cup, so as to always be above the surface of the oil contained therein. The other opening, 5, which may also be provided with a tube, 7, extending downward a short distance, is controlled by a cock or valve, 8, the stem of which is surrounded by a suitable stuffing-box, 9, and is provided with a knob or lever, 10, for operating the valve. The openings 4 5 in the bottom of the oil-cup communicate through a suitable connecting-passage, to be hereinafter described, with the top of an air-chamber, 11, of a capacity equal to or considerably greater than that of the oil-cup, which latter is attached to and communicates through an opening, 12, in its bottom, with the cylinder, steam-chest, or other device, 13, into which it is desired to feed the oil against the pressure of the steam or other fluid or liquid.

The passage leading from the opening 12 may be provided with a valve or cock, 14, by which all communication with the lubricating apparatus can be cut off when desired.

The operation of the apparatus thus far described will be readily understood. The cock or valve 14 being opened, and the valve 8 being turned so as to permit the oil to flow through the opening 5 with the desired rapidity, the oil will flow unobstructedly downward through the opening 12 to the parts which it is desired to lubricate. As the oil passes out of the cup 1 its place will be taken by the air in the chamber 11, which will flow freely upward through the tube 6 to the space above the oil, thus preventing the formation of a partial vacuum, which would stop the flow of the oil. By means of the body of air confined in the chamber 11, the steam is prevented from passing through the tube 6 into the oil-cup above the oil. This is an important feature, because if steam were allowed to pass into said cup more or less condensation would take place in the cup, and the water thus formed, being heavier than the oil, would settle to the bottom of the cup, so that instead of feeding oil the apparatus would feed water, or oil and water mixed, thereby preventing perfect lubrication.

In the practical operation of the structure shown in my former patent it sometimes happened that when the steam was suddenly admitted against the volume of air in the chamber 11 some of it would force its way through said body of air and enter the oil-cup. To obviate this I have, in the present structure, placed what I term an "arrester" at or near the bottom of the air-chamber. This arrester consists of a plate or diaphragm, 15, which is secured at its edges to the walls of the chamber, said plate being slightly raised at its center and provided at its edges with a series of holes, as 16, as shown in Fig. 2. From this construction it results that when the steam is admitted suddenly, instead of forcing itself directly against the confined air, it is arrested by the plate 15 and compelled to pass upward in small quantities through the perforations 16. This construction, I find, entirely obviates the difficulty referred to. Another defect in the structure shown in my former patent was due to the fact that in case the opening 5 became clogged by impurities in the oil, which sometimes happened, there was no ready means for detecting such stoppage. There was also in my former structure no means by which the engineer could observe just how fast the oil was flowing, so as to determine whether or not the valve 8 was in the proper position. To obviate these difficulties I have connected the air-chamber and the oil-cup by a short tube, 17, of glass or other transparent substance, so that the engineer can at any time observe the rapidity with which the oil is passing from the cup, and regulate the valve 8 accordingly. The tube 17 must of course be of sufficient strength to resist a high degree of pressure, and to avoid the danger of its being accidentally broken it should be protected by metallic guards, as shown. It will be connected to the air-chamber and oil-cup by suitable steam-tight couplings, as shown.

The tube 6, instead of being located inside of the oil-cup, may of course be outside, and be arranged to enter the air-chamber and the oil-cup above the surface of the oil.

When the air-chamber is made in the ordinary way, as shown in Fig. 1, it should be as large as or considerably larger than the oil-cup, so that sufficient air can pass from it to fill the oil-cup without permitting the steam to rise high enough to pass into the latter. In Figs. 3 and 4 I have, however, illustrated devices by which air may be periodically supplied to the chamber, so that it may be made of comparatively small size, thereby making the apparatus, as a whole, much more compact, and consequently more desirable. To accomplish this the opening 12 at the bottom of the air-chamber is provided with a downwardly-opening valve, 20, the rod 19 of which extends upward through the chamber, and carries at its upper end a second valve, 21, which opens upward and is seated in an opening in the top of the chamber. The valves 20 21 are operated by a spring, 18, to which the rod 19 is secured, and which extends across the chamber, with its ends resting in bearings 24 25 at the sides. The bearing 24 is swiveled to the end of an adjusting-screw, 22, passing through the side of the chamber, and by which the curvature of the spring can be regulated so as to adjust the valves to any desired position.

The operation of these parts is as follows:

The spring 18 will be so adjusted that when in its normal condition the valve 21 will be held firmly in its closed position and the valve 20 opened. When the parts are in these positions, the steam will pass freely upward through the opening 12, to supply the place of the air which passes from the chamber 11 as the oil passes from the cup 1. This will continue until a large part of the air has been forced out of the chamber, by which time the heat of the steam will have so expanded the spring 18 as to increase its upward curvature to such an extent as to open the valve 21 and close the valve 20, thereby shutting off the entrance of steam to the chamber and permitting air to flow in around the valve 21 to expel the steam already there and refill the chamber with air. The cool air flowing into the chamber will at once cause the spring 18 to contract, so as to reclose the valve 21 and reopen the valve 20, when the same operation will be repeated.

When the apparatus just described for automatically supplying air to the air-chamber is used, the arrester may in some cases be dispensed with.

It will usually be found advantageous to provide the air-chamber with a relief-cock, as 23, through which the confined air can be allowed to escape when desired.

What I claim is—

1. The combination, with the closed oil-cup, of the air-chamber provided with the arrester 15, substantially as described.

2. The combination, with the closed oil-cup, of the air-chamber provided with the arrester 15, said cup and chamber being connected by a transparent tube, as 17, substantially as described.

3. The combination, with the closed oil-cup and the air-chamber, of means for automatically supplying air to said chamber, substantially as described.

4. The combination, with the closed oil-cup, of the air-chamber, the valves 20 21, and the spring 18, substantially as described.

5. The combination, with the oil-cup and the air-chamber, of a tube, as 6, affording free communication between the latter and the air above the oil in the former, the cup and chamber being connected by a transparent tube, as 17, substantially as described.

6. The combination, with the closed oil-cup and the air-chamber, of a size equal to or greater than that of the oil-cup, of a tube, as 6, affording free communication between the latter and the air above the oil in the former, the cup and chamber being connected by a passage, as 5, provided with a valve, as 8, and a transparent tube, as 17, substantially as described.

In testimony whereof I have hereunto set my hand in the presence of two subscribing witnesses.

WM. W. ROSENFIELD.

Witnesses:
J. A. HOVEY,
T. H. PALMER.